Patented Sept. 21, 1943

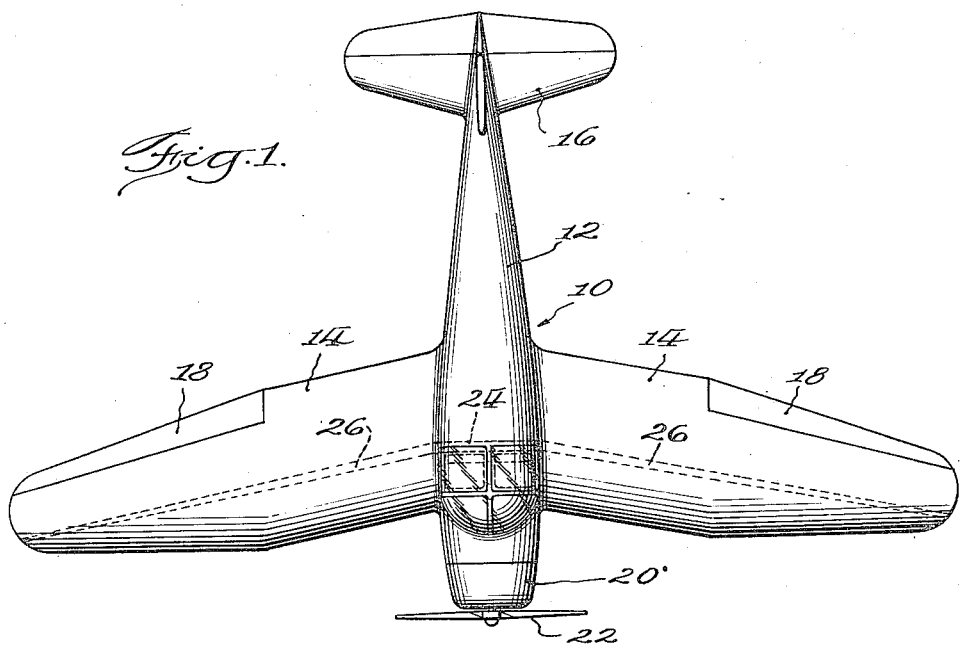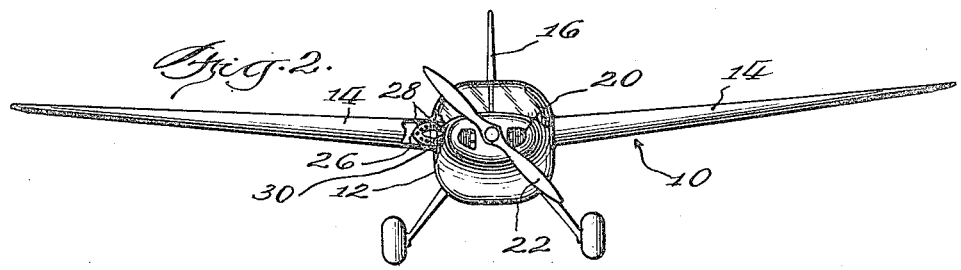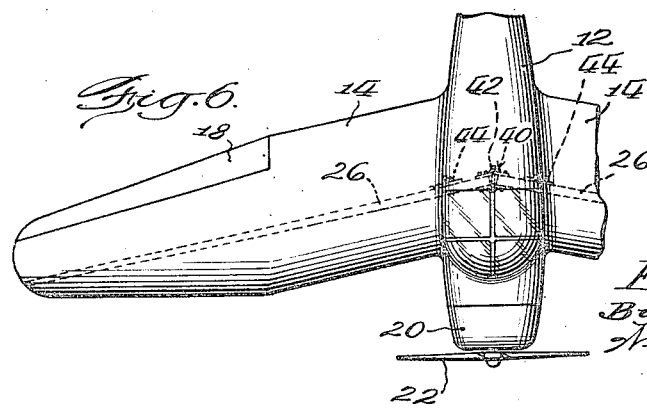

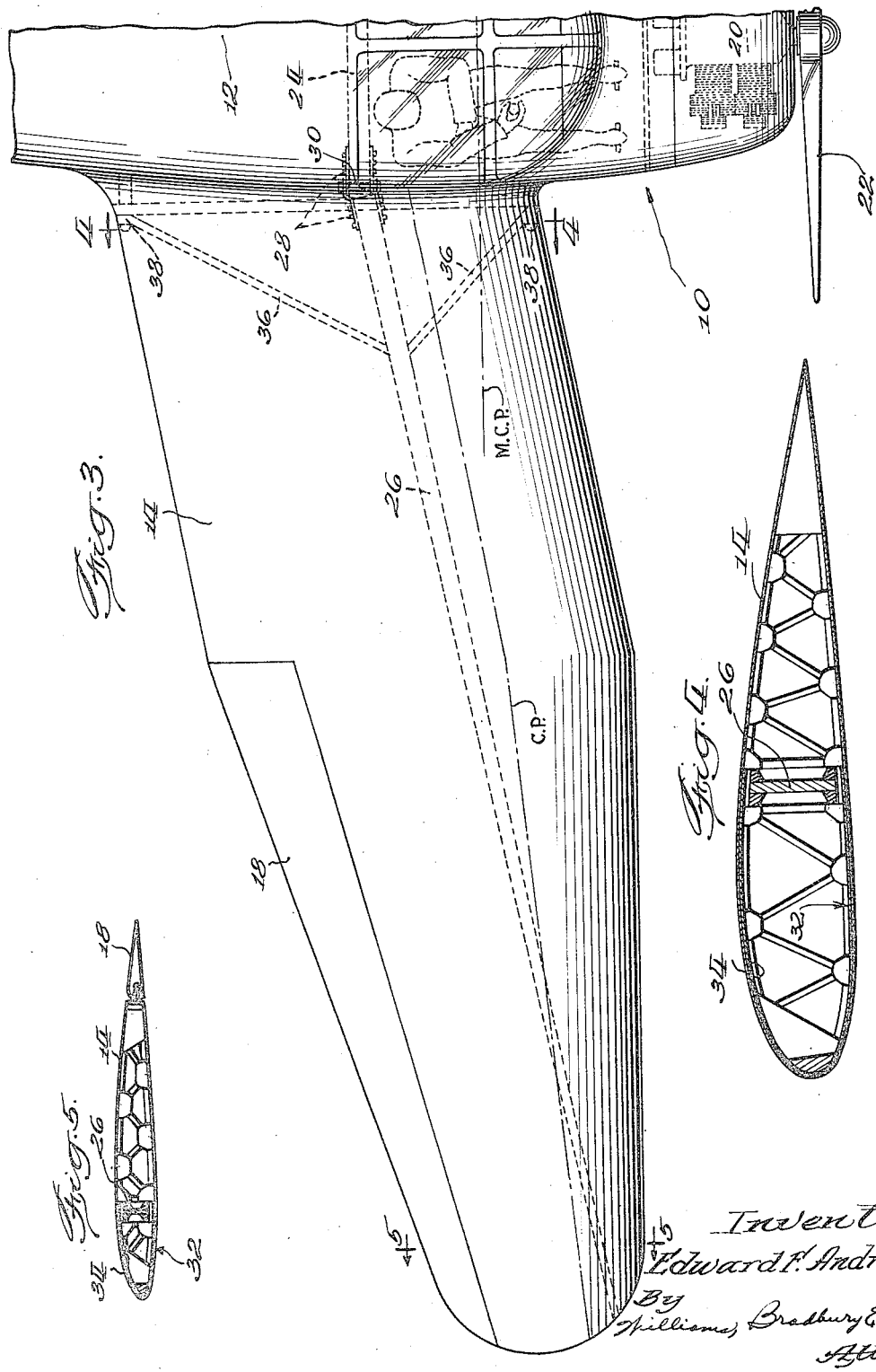

2,329,814

UNITED STATES PATENT OFFICE 2,329,814

AIRCRAFT

Edward F. Andrews, Chicago, Ill.

Application September 23, 1940, Serial No. 357,832

14 Claims. (Cl. 244—13)

This invention relates to aircraft and more particularly to the construction of an airplane wing, an arrangement of the wing spar within the wing, the plan form of the wing, and the relation of the wing to the airplane fuselage.

The arrangement of parts comprising my invention is of particular advantage in the construction of airplanes having cantilever wings attached to the fuselage at any point substantially above a low-wing position, and finds its widest application in airplanes of the mid-wing type wherein the interior arrangement provides for the side-by-side seating of two persons. The invention is not limited, however, to such types, the above examples being recited merely as aircraft types wherein the problem solved by this invention is particularly apparent.

It is one of the objects of my invention to provide a new and improved aircraft wherein the wing spar passes through the fuselage at a point considerably behind the center of gravity of the aircraft.

An additional object of the present invention is to provide a novel wing construction in which the wing spar slants forwardly and outwardly from a position adjacent the center of the chord at the root of the wing to a position adjacent the front edge of the wing near the tip of the wing.

An additional object of the present invention is to provide a novel wing construction and arrangement that enables the wing spar to be secured to the fuselage of an aircraft at a point well behind the center of gravity of the aircraft.

A further object is to provide an improved aircraft wherein the visibility of the pilot is improved by the backward and inward slant of the front edge of the wing at the root portion while excessive sweep forward of the wing as a whole is avoided by straightening out the front edge of the wing from a point substantially out from the fuselage to the tip of the wing.

A further object is to provide a monospar wing in which the wing spar is located forwardly of but adjacent to the middle of the chord, but in which the resistance of the wing to flutter is increased by locating the wing spar close to the leading edge of the wing near the wing tip.

A further object of my invention is to provide a cantilever mid-wing or shoulder wing airplane of novel construction in which two people are seated side-by-side ahead of the wing spar and at or adjacent to the center of pressure of the airplane.

A further object is to provide a high or mid-wing cantilever airplane with the motor in the nose, with accommodations for pilot and passenger seated side-by-side ahead of a single wing spar and at or adjacent to the aerodynamic center of the airplane.

A further object is to provide a wing with a wing spar slanting forwardly and outwardly relative to a line perpendicular to the flight direction, the wing having a rear edge swept forwardly to a greater degree than the wing spar at a position part way out toward the tip, and a front edge swept forwardly to a lesser degree than the wing spar at a position part way out toward the tip.

A further object is to provide a monospar wing in which the wing spar is located forwardly of but adjacent to the center of the chord at the root to move the elastic axis backward and to provide torsional rigidity, and in which the wing spar slants forwardly toward the tip of the wing to a location behind but adjacent to the front edge of the wing near the tip to bring the center of mass of the tip portion of the wing farther forward.

Other objects and advantages will become apparent from the following description of a preferred embodiment of my invention taken in conjunction with the accompanying drawings, in which similar characters of reference refer to similar parts throughout the several views.

In the drawings:

Fig. 1 is a plan view of a mid-wing aircraft embodying the present invention;

Fig. 2 is a front elevation of the aircraft shown in Fig. 1 with a portion of one of the wings broken away at the root section to show the manner of attaching the wing to the fuselage;

Fig. 3 is a fractional enlarged plan view showing one wing and the adjacent portion of the fuselage of the aircraft shown in Figs. 1 and 2;

Fig. 4 is a transverse sectional view taken in the direction of the arrows along the line 4—4 of Fig. 3, showing the position of the spar in the wing at a point near the wing root;

Fig. 5 is a sectional view taken in the direction of the arrows along the line 5—5 of Fig. 3, showing the position of the spar in the wing at a point near the wing tip; and Fig. 6 is a plan view of one wing and the adjacent portion of the fuselage of an aircraft, showing an alternative embodiment of my invention.

Referring to the drawings, I have shown an airplane 10 comprised essentially of a fuselage 12, wings 14, empennage 16, ailerons 18, motor 20, and propeller 22.

With conventional methods of construction it is almost impossible to construct a cantilever mid-wing aircraft of the type shown wherein the passangers are seated in a side-by-side arrangement, since conventional practice would require that the wing spar pass through the portion of the fuselage occupied by the passangers. This is because it is desirable to have the occupants sit adjacent to the center of pressure and the center of gravity of the aircraft, and it is conventional practice to require that the wing spar pass through the fuselage at such a point that it normally would interfere with the placing of the occupants in this desired position.

In cantilever high-wing monoplanes the same situation arises excepting that here the wing spar usually passes through the top portion of the fuselage at such a point that it lowers the effective ceiling height in the cabin of the aircraft.

According to the present invention, the occupants are seated in the aircraft in the preferred location and a short spar 24 extends across the fuselage transversely in a position immediately behind the cabin portion. This spar is firmly secured to the fuselage longerons or other structural members. The wing spars 26 are connected at their inward ends to the outward ends of the short spar 24 by means of a pair of mutually engaging fittings 28 secured to the spars 26 and to the short spar 24. The fittings 28 on the spars 26 and the short spar 24 should be coupled with pins or bolts 30 extending through aligned ears or other suitable elements positioned as far apart vertically as the thickness of the wing will allow.

The spars 26 extend outwardly and forwardly from the fuselage so that at or near the wing root they are, for example, positioned approximately 40% of the chord rearwardly of the leading edge, while at or near the wing tips the spars are, for example, only approximately 20% of the chord distance from the leading edge. In addition, the wings are themselves swept forwardly so that the effective center of pressure of the wing as a whole is somewhat ahead of the center of pressure of the wing at the root. This forward sweep of the wing also has the advantageous effect of delaying the tendency of the wings to tip stall at high angles of attack.

The wing I have shown includes a D section torsion resisting truss 32 which is formed of a sheet of bent plywood 34 secured to the top and bottom of the spar 26 and which extends beneath the wing covering around the forward portion of the wing. The root of the wing should be attached to the fuselage members at or near the leading and trailing edges as well as at the spar, while diagonal bracing members 36 should extend inwardly from an outward point on the spar to the forward and rearward attachment fittings 38.

The center of pressure along the wing shown in Fig. 3 is indicated approximately at the line C. P., while the mean center of pressure of the wing as a whole is indicated approximately at M. C. P.

With such an arrangement as I have described, the occupants will sit at or adjacent to the center of gravity of the aircraft. The center of gravity will be in the proper location relative to the center of pressure of the airplane, and the portion of the spar passing through the fuselage will be behind the occupants.

The tendency of a wing to flutter is most pronounced at the tip, and at this portion of the present wing the spar is in a position considerably ahead of its normal location, thus shifting the center of mass of the tip portion of the wing forwardly considerably ahead of its ordinary position. Preferably this forward shift of the center of mass should be accentuated so far as is possible by constructing the portion of the wing rearwardly of the spar as light as is practicable. The forward shift of the center of mass of the tip portion of the wing has the effect of decreasing the tendency of this portion of the wing to flutter. Or stated in an alternative manner, it raises the speed at which wing flutter develops. Although this arrangement of the wing spar has the effect of shifting the center of mass of the wing rearwardly at the root section, this is not important inasmuch as the root section of a wing is sufficiently rigid torsionally to prevent flutter.

On the other hand, the rearward shift of the wing spar at the root section, which is the strongest and therefore heaviest portion of the spar, has the advantageous effect of shifting the center of gravity of the aircraft rearwardly somewhat, thus providing an aircraft that is substantially in balance without load. The load, therefore, need not be used to balance the airplane.

According to my invention, the type of wing used with a cantilever high-wing monoplane may be exactly the same as the one shown.

In the alternative embodiment shown in Fig. 6, I have shown an arrangement wherein the wing spars 26 extend directly into the fuselage and are provided at their ends with suitable fittings 40 connected together by pins or bolts 42. With this arrangement the pins 42 can be placed farther apart vertically, if desired, than those in the first described embodiment, since this vertical distance is not limited by the wing thickness. No separate short spar extending across the fuselage is necessary with this arrangement and it will be apparent from the drawings that this construction permits the passengers to be shifted slightly farther to the rear, if desired, than the arrangement first described. In this second arrangement it will, of course, be necessary to provide the portion of the spars at the ends of the wings with fittings 44 which are secured to complementary fittings attached to the fuselage longerons or other structural members of the fuselage.

Having described a preferred embodiment of my invention, what I claim as new and useful and desire to secure by Letters Patent of the United States is:

1. In an airplane, the combination comprising, a fuselage, a cantilever monospar extending through said fuselage and having a pronounced forward and outward slant therefrom, and a tapered cantilever wing carried by said spar having the outer portion of its leading edge slanting forwardly less than the slant of the wing spar and the inner portion of its leading edge slanting forwardly more than the outer portion of its leading edge and having its trailing edge slanting forwardly at least as much as the wing spar.

2. In an aircraft, in combination, a monospar passing through the fuselage between the top thereof and a low mid-wing position, and a cantilever wing carried by said spar, said wing having an inner section of substantially uniform chord and having a substantial forward sweep and an outer section tapering toward the tip, the leading edge of said outer section having a forward sweep less than the inner section and a trailing edge having a forward sweep greater than the inner section, said monospar slanting forwardly more than a line through the aerodynamic centers of said wing located at the wing tip and the wing root.

3. In an aircraft, in combination, a monospar passing through the fuselage between the top thereof and a low mid-wing position, said spar passing through said fuselage at a point considerably behind the center of gravity of the aircraft, and a forwardly swept cantilever wing carried by said spar, said monospar also being swept forwardly and the forward sweep of said monospar being greater than the forward sweep of a line through the aerodynamic centers of said wing located at the wing tip and the wing root.

4. In an airplane, the combination comprising, a fuselage, a motor in the nose thereof, a forwardly swept cantilever wing attached to the fuselage, and a single wing spar passing through the fuselage and slanting outwardly and forwardly through said wing from a position between the center of the chord and the center of pressure at the root of the wing to a position between the leading edge of the wing and the center of pressure near the wing tip.

5. In an airplane, in combination, a fuselage, said fuselage having side-by-side seats for two occupants, a short spar extending from side to side of said fuselage in a position rearwardly of said space, a cantilever monospar, means to attach the inner end of said wing spar to said short spar and a wing mounted on said monospar and swept forwardly so that a line drawn through the center of pressure near the root section and through the center of pressure near the tip section slants forwardly and outwardly, said monospar having a greater forward and outward slant than said line.

6. In an airplane, in combination, a fuselage, said fuselage having side-by-side seats for two occupants, forwardly swept monospar wings attached to said fuselage, the spars in said wings being swept forwardly more than the line through the aerodynamic center of said wings at the wing roots and the aerodynamic center of said wings at the wing tips, said spars extending inwardly of said fuselage in a position rearwardly of said space, and means to connect the inner ends of said spars.

7. In an airplane, in combination, a fuselage, side-by-side seats arranged in said fuselage, a motor located forwardly of said seats, a monospar passing through said fuselage substantially above the bottom thereof and behind said seats, a wing carried by said monospar, said wing being swept forwardly so that its center of pressure at a point near the tip is located substantially ahead of its center of pressure at a point near its root, and said monospar sloping outwardly and forwardly so that it is substantially to the rear of said center of pressure at said point near the root and at least as far forward as the center of pressure at said point near the tip.

8. In an airplane, in combination, a fuselage, a cantilever wing, a monospar extending through said fuselage and slanting outwardly and forwardly through said wing so as to cross a line drawn through the aerodynamic center of a chordwise section of the wing near the root of the wing and through the aerodynamic center of a chordwise section of the wing near the tip of the wing, said monospar being located closer to the mid point of the chordwise section than to the aerodynamic center of the chordwise section of said wing at the root and closer to the leading edge than the center of the chordwise section of said wing near the tip.

9. In an airplane wing, a monospar slanting forwardly and outwardly through said wing so that said monospar is located substantially behind the center of pressure of a chordwise section of said wing near the root and substantially ahead of the center of pressure of a chordwise section of said wing near the tip.

10. An airplane wing having a monospar slanting forwardly and outwardly relative to a line drawn through the center of pressure of the chord at the root of the wing, the center of pressure of a chordwise section of the wing at the tip of the wing, and the center of pressure of a chordwise section of the wing at an intermediate position of the wing between the root and tip; said spar being located substantially behind said line near the wing root and crossing said line so that said spar is located substantially ahead of said line at the wing tip, whereby the torsional axis of the wing is moved rearwardly near the root while the center of mass of the wing, including the spar, is moved forwardly near the tip to increase the wing's resistance to flutter.

11. An airplane wing, comprising an inner portion and an outer portion, said wing as a whole being tapered and being swept forwardly, the major portion of the forward sweep of said wing being confined to said inner portion and the major portion of the taper of said wing being confined to the outer portion, said wing including a wing spar, and said wing spar sloping forwardly relative to a line through the center of pressure of said wing near its tip and the center of pressure of said wing at the juncture of the outer portion with the inner portion.

12. An airplane wing, comprising, an inner portion and an outer portion, said wing as a whole being tapered and being swept forwardly, the major portion of the forward sweep of said wing being confined to said inner portion and the major portion of the taper of said wing being confined to the outer position, said wing including a wing spar so located that a line through the center of pressure of the wing as a whole and normal to the direction of flight passes through the wing root at a point substantially ahead of the portion of the spar located in the wing root.

13. An airplane wing tapered and swept forwardly from the root toward the tip, a monospar passing through said wing and sloping forwardly relative to a line drawn through the center of pressure of the wing section near the root and through the center of pressure of the wing section near the tip, and said spar being located in said wing substantially to the rear of the center of pressure of the wing section at the root, whereby the torsional axis of the wing is moved rearwardly near the root while the center of mass of the wing is moved forwardly near the tip to increase the wing's resistance to flutter.

14. In an aircraft having a fuselage, in combination, a motor in the nose of said fuselage, side-by-side seats for two occupants in said fuselage immediately behind said motor, a wing bar located immediately to the rear of the seats having portions extending outwardly and forwardly from the fuselage, a pair of wings located at opposite sides of the fuselage, each of said wings comprising an inner and an outer portion, and each as a whole being tapered and being swept forwardly so as to locate the mean center of pressure of the wings close to the forward portions of the seats, the major portion of the forward sweep of each wing being confined to its inner portion and the major portion of the taper of each wing being confined to its outer portion, said wings being mounted on said outwardly and forwardly extending portions of the wing bar, and each of said wing bar portions having a forward slant relative to a line through the center of pressure of a wing near its tip and the center of pressure of the wing at the juncture of the outer portion with the inner portion.

EDWARD F. ANDREWS.